Dec. 25, 1923.
C. APOTHÉLOZ
1,478,628
TEA AND COFFEE STRAINER
Filed Nov. 26, 1921
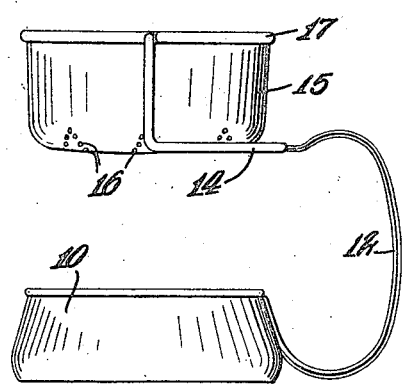
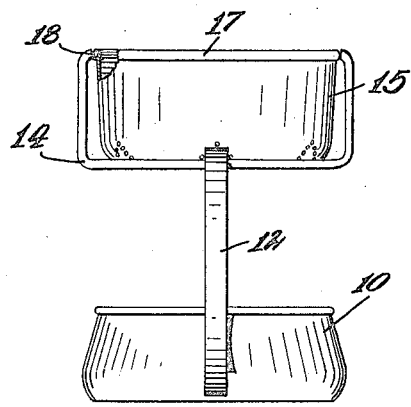
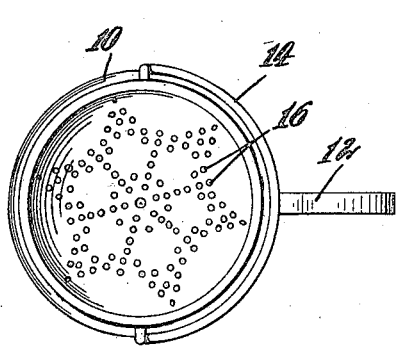
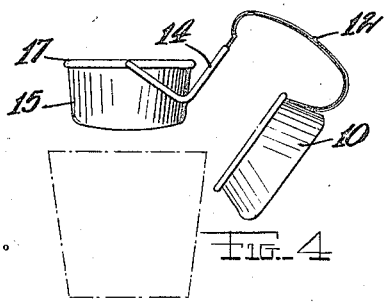
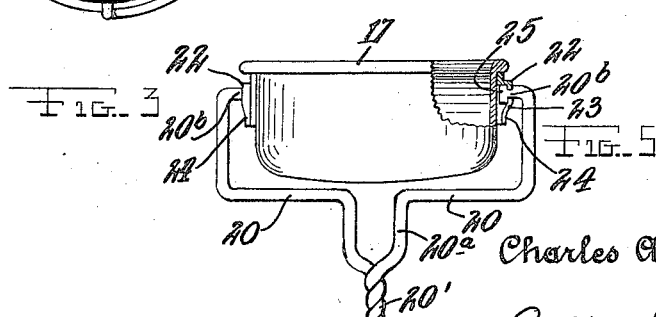
Inventor
Charles Apothéloz
By Gottau A. Polachek
Attorney Patented Dec. 25, 1923.

1,478,628

UNITED STATES PATENT OFFICE.

CHARLES APOTHÉLOZ, OF NEW YORK, N. Y.

TEA AND COFFEE STRAINER.

Application filed November 26, 1921. Serial No. 518,008.

*To all whom it may concern:*

Be it known that I, CHARLES APOTHÉLOZ, citizen of Switzerland, residing at New York, in the county of New York and State of New York, have invented certain new and useful Improvements in Tea and Coffee Strainers, of which the following is a specification.

This invention relates to a tea and coffee strainer which is adapted for embodiment in an article entirely separate from and independent of the pot or other receptacle containing the tea or coffee.

The invention has for an object to provide a novel strainer which embodies in its structure a receptacle for the drippings from the strainer.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a tea and coffee strainer constructed according to the invention.

Fig. 2 is a vertical elevation at right angles to Fig. 1, a part of the strainer proper being shown in section.

Fig. 3 is a plan view.

Fig. 4 is a side view of the strainer in the position assumed when in use.

Fig. 5 is a part elevation and part vertical sectional view, showing a modification.

In constructing my improved strainer I provide a shallow receptacle or pan 10, preferably having a slightly constructed top, so as to permit of the retention of a quantity of liquid when the pan is tilted, the pan being here shown as of roughly frusto-conical form. This pan 10 both acts as a stand for the strainer when the latter is not in use and serves as a receptacle to receive such liquid as may drip from the strainer subsequent to use thereof.

Fixed to one side of the pan 10 is a strap 12 which serves both as a handle for holding and manipulating the strainer, and also as a supporting post or standard for the strainer proper. This strap projects upwardly at one side of the pan for a distance above the latter, being preferably curved as shown in Fig. 1 for convenience in grasping. The upper end of this strap 12 has fixed thereto a bail-like rod 14 on which is pivotally mounted the strainer proper which is here in the form of a small metal pot 15 having its bottom perforated as at 16. The bail 14 is connected to the upper edge of the strainer 15, the latter being formed with a circumferential bead 17 having suitable sockets on opposite sides thereof to receive the diminished ends of the bail, as indicated at 18 in Fig. 2. The bail 14 is preferably of angular shape as seen in side view, the ends extending vertically down opposite sides of the strainer 15, while the intermediate semi-circular portion extends horizontally in approximately a common plane with the bottom of the strainer. The handle member 12 is connected to the bail midway between the ends of the latter.

When the strainer is being used it is held with the pan 10 and handle 12 in the tilted position shown in Fig. 4 which projects the strainer 15 to one side of the pan 10 so that the strainer may be readily positioned over a cup or like receptacle, the pivotal suspension of the strainer causing it to maintain an upright position. The device can then be placed on a table or other support in the position shown in Fig. 1, the pan 10 then receiving any drops that may fall from the strainer 15.

In Fig. 5 I have shown a modified arrangement of the supporting elements for the strainer 15. In this arrangement the bail and handle element are combined in a single length of wire 20 which is adapted to be secured to the pan similarly to the strap 12 and is bent to a form, as seen in side view, similar to the handle 12 and bail 14. The two reaches of the handle forming part of the wire are twisted together as shown at 20', except adjacent the upper end of the handle part where they are separated as at 20$^a$. Upon the sides of the strainer a pair of socket caps 22 are soldered, these caps being slotted upwardly for a distance from the bottom as at 23 to permit of insertion of the inturned ends 20$^b$ of the wire 20 under said caps to suspend the strainer. The walls of these slots 23 are preferably bulged inwardly near their lower ends as at 24 to form resilient retainer elements engaging disk-heads such as 25 on the wire ends 20$^b$ to hold the strainer 15 against displacement. By compressing the wire elements 20$^a$ in the hand, after the device has been tilted to the position shown in Fig. 4, the heads 25 can be forced against the sides of the strainer 15 to frictionally hold the latter against swinging movement.

Having thus described my invention what I claim as new and desire to protect by Letters Patent of the United States is as follows:

1. A strainer of the type described comprising a pan, a post secured to one side of the said pan and adapted to serve as a handle, said post having at its upper end a laterally offset bail-like element, and a strainer element pivotally suspended from the said bail-like element.

2. A strainer of the type described comprising a pan, a post secured to one side of the said pan and adapted to serve as a handle, said post having at its upper end a laterally offset bail-like element, and a strainer element pivotally suspended from the said bail-like element, said bail-like element being of angular form as seen in side view to present a horizontal intermediate portion and end portions extending upward from said intermediate portion and engaged at their tops with the said strainer element.

3. A strainer of the type described comprising a pan, a combination post and handle secured to one side of the said pan, a bail-like element on the upper end of the post, a strainer element pivotally suspended from said bail-like element, disks on the ends of said bail-like element, and socket members on said strainer element in which said disks are received.

4. A strainer of the type described comprising a pan, a combination post and handle secured to one side of the pan, and a strainer element pivotally suspended from the upper end of said post, the said post including a bail-like element pivotally engaging the strainer element adjacent the upper edge of the latter, and means whereby the ends of the bail-like element may be clamped against the sides of the strainer element.

5. A strainer of the type described comprising a pan, a combination post and handles secured to one side of the pan, and a strainer element pivotally suspended from the upper end of said post, the said post comprising a doubled rod spread at its ends to bail-like form and presenting spaced reaches in its handle portion, disks on the ends of said rod, and socket members on said strainer element in which said disks are received.

6. A strainer of the type described comprising a pan, a combination post and handles secured to one side of the pan, and a strainer element pivotally suspended from the upper end of said post, the said post comprising a doubled rod spread at its ends to bail-like form and presenting spaced reaches in its handle portion, disks on the ends of said rod, and socket members on said strainer element in which said disks are received, said socket members being formed by caps fixed on the sides of the strainer element and slotted upwardly from their lower edges, the lower portions of side walls of said slots being bulged toward the sides of the strainer elements, for the purpose specified.

In testimony whereof I have affixed my signature.

CHARLES APOTHÉLOZ.